United States Patent [19]
Tsuzuki et al.

[11] 3,933,057
[45] Jan. 20, 1976

[54] AUTOMOTIVE VEHICLE SHIFT CONTROL MECHANISM FOR MANUAL TRANSMISSIONS

[75] Inventors: Isao Tsuzuki, Kariya; Yasuie Takahashi; Hideaki Koga, both of Toyota, all of Japan

[73] Assignee: Toyota Jidosha Kogyo Kabushiki Kaisha, Japan

[22] Filed: Aug. 8, 1974

[21] Appl. No.: 496,025

[30] Foreign Application Priority Data
Dec. 29, 1973 Japan.................................. 49-1983

[52] U.S. Cl..................................... 74/476; 74/476
[51] Int. Cl.² .................... G05G 9/12; F16H 57/06
[58] Field of Search...................................... 74/476

[56] References Cited
UNITED STATES PATENTS

| | | | |
|---|---|---|---|
| 3,192,788 | 7/1965 | Fodrea............................. | 74/476 X |
| 3,496,797 | 2/1970 | Stott et al. ............................ | 74/476 |
| 3,866,488 | 2/1975 | Nakata et al. ........................ | 74/476 |

*Primary Examiner*—Allan D. Herrmann
*Attorney, Agent, or Firm*—Toren, McGeady and Stanger

[57] ABSTRACT

A shift control mechanism is provided for a multiple-forward-speed manual transmission with controlled operation of the shift lever between the reverse drive position and one forward drive position to prevent inadvertent shifting which might damage the transmission. A transmission lever whose movement is controlled through the shift lever is formed with a first projection extending therefrom which is adapted to engage a second projection extending from a housing. The housing is rotatably and linearly movable under the biasing force of spring means and when the shift lever is moved to the neutral position, engagement between the first and second projections will cause rotative movement of the housing. When the shift lever is moved to the one forward drive position, the spring means will rotate the housing back to its initial position thereby placing the second projection within the path of movement of the first projection. Any subsequent attempt to move the shift lever from the one forward drive position to the reverse drive position will be blocked in a manner which will not interfere with otherwise appropriate shifting of the transmission. The control mechanism may be configured to prevent erroneous shifting in both directions between the reverse drive position and the one forward drive position or, alternatively, shifting may be blocked in one direction only.

20 Claims, 16 Drawing Figures

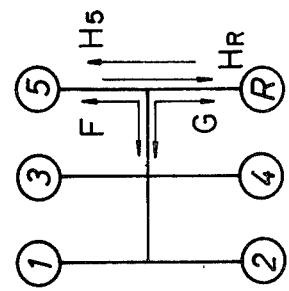
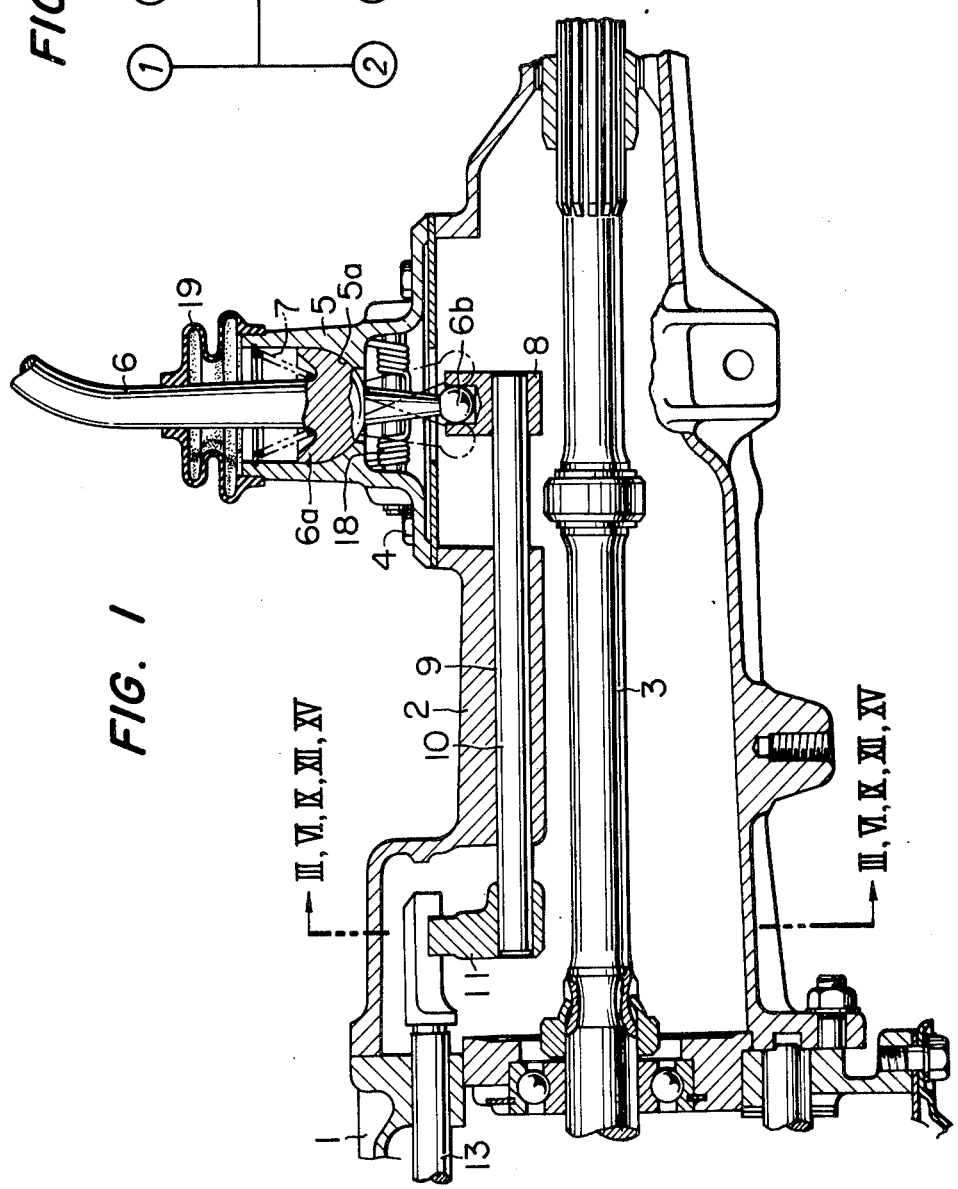
FIG. 2
FIG. 1

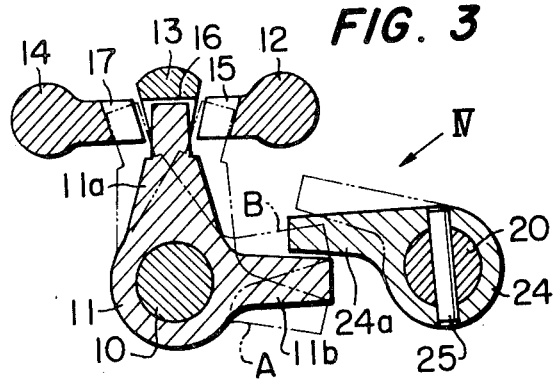
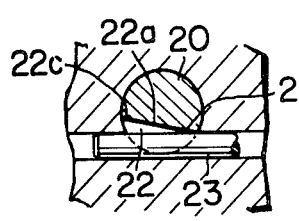
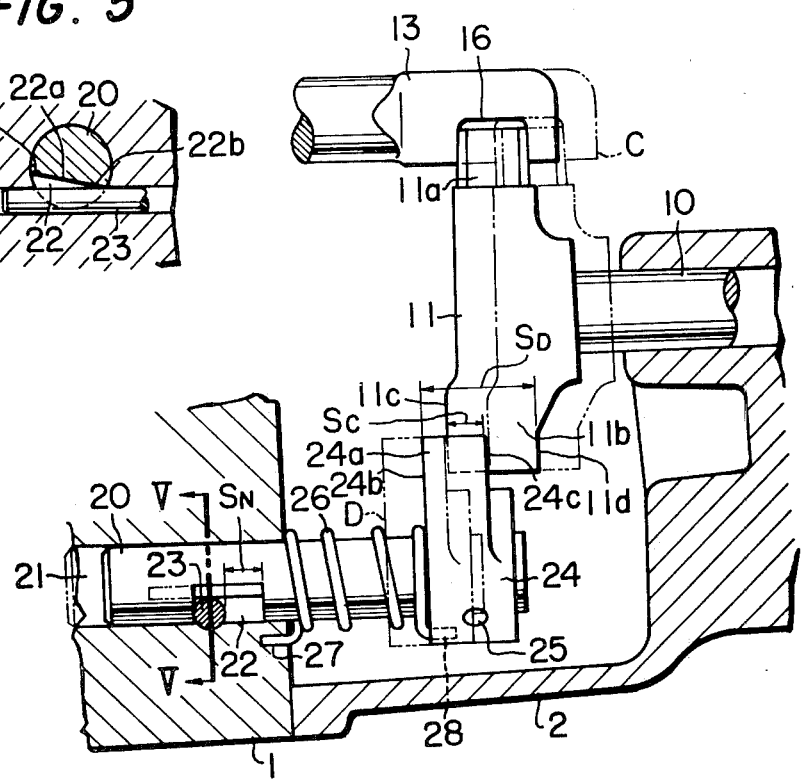

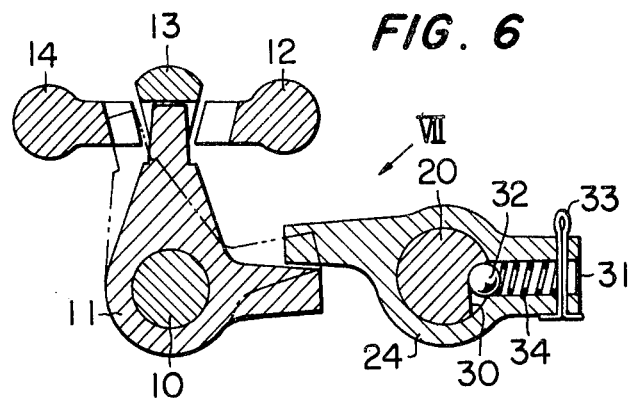
FIG. 6
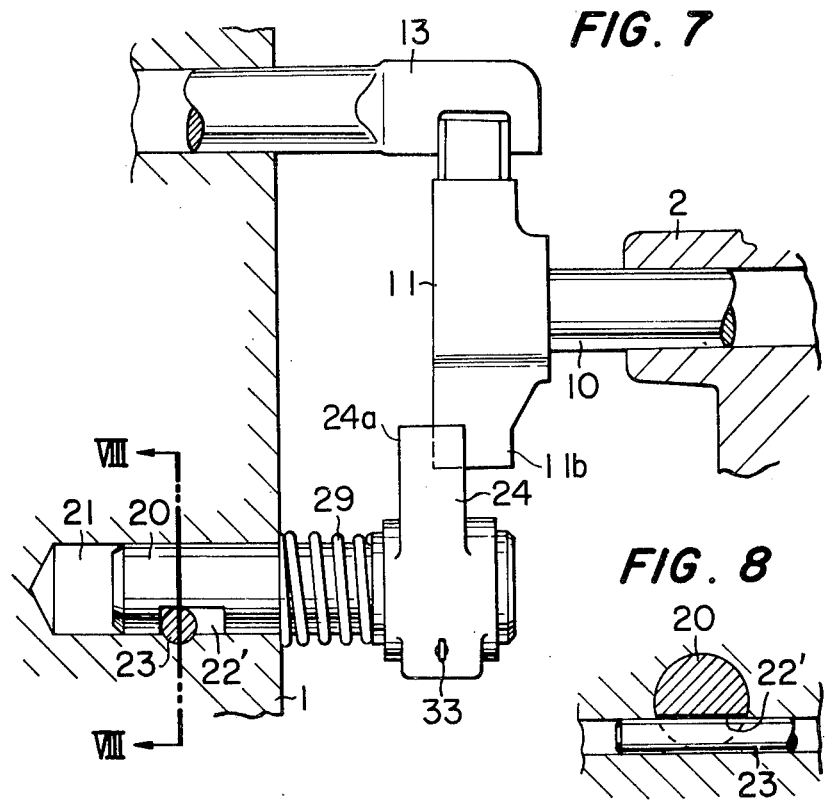
FIG. 7
FIG. 8

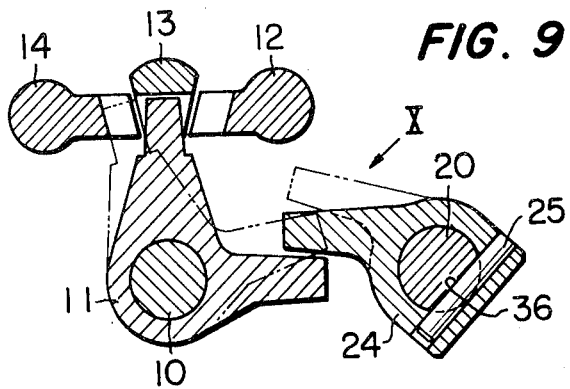
FIG. 9
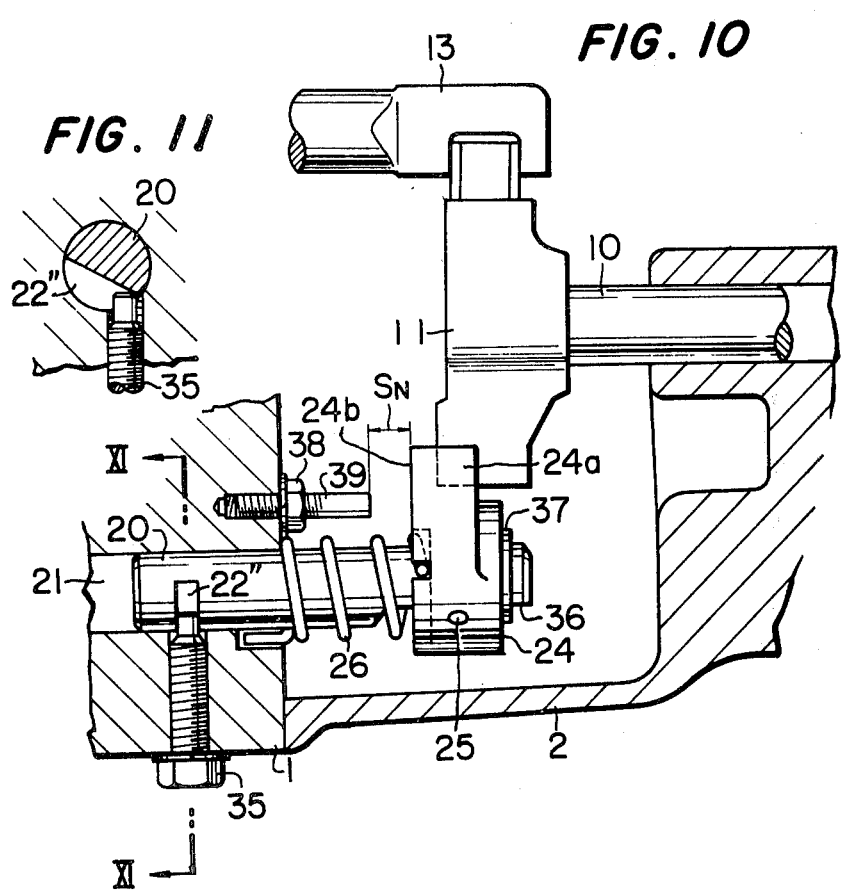
FIG. 10
FIG. 11

AUTOMOTIVE VEHICLE SHIFT CONTROL MECHANISM FOR MANUAL TRANSMISSIONS

BACKGROUND OF THE INVENTION

The present invention relates to automotive vehicle transmissions and more particularly to a shift control mechanism for a manual transmission involving a plurality of forward drive positions and a reverse drive position. The control mechanism is specifically involved with controlling movement of the shift lever between one of the forward drive positions and the reverse drive position wherein these two positions lie in a linear path through which the shift lever moves therebetween. Erroneous shifting, which might occur if the shift lever were to be moved directly through said linear path from said one forward drive position to the reverse position, is prevented.

As is well known, a shift mechanism for a manual transmission having five forward drive positions and a reverse drive position is usually arranged with a shifting pattern wherein the shift lever is moved along three linear paths, with two drive positions being located at the opposite ends of each linear path. Thus, shifting of the transmission between a first and a second speed ratio is effected by moving the shift lever between two positions lying at the ends of one of said linear paths, with the third and fourth speed ratios being obtained by moving the shift lever to positions lying at the ends of a second linear path. The fifth speed ratio position and the reverse drive position are usually located at the ends of a third linear path of the shift lever, and when it is intended to downshift the transmission from the fifth or highest forward speed ratio during high speed vehicle operation, the shift lever could inadvertently be moved into the reverse drive position, thereby causing serious transmission damage and dangerous vehicle operating conditions.

Various mechanisms have been proposed to prevent such misshifting, among them being one which requires that the shift lever be pressed downwardly or pulled upwardly when it is to be moved into the reverse drive position. Another proposal has been to require manipulation of a button or the like independently of but concurrently with manipulation of the shift lever. In either case, however, such manipulation will present difficulties and require some skill on the part of a vehicle operator and it thus becomes difficult for the operator to accomplish such manipulations with ease during operation of the vehicle with the operator sitting at a normal position in the driver's seat. Moreover, the structure of such a transmission mechanism will inevitably involve undesirable complexity.

Accordingly, the present invention is intended to provide an improved shift control mechanism for use with a multiple forward speed manual transmission in which a transmission lever is activated by manipulation of a shift lever to selectively operate one of a plurality of fork shafts of the transmission in order to effect a reverse speed ratio and one forward speed ratio each of which lie at opposite ends of a linear path forming a part of the shifting pattern of the shift lever.

The invention provides a mechanism of the above type which operates to control the shifting operation which occurs between the reverse drive position and the one forward speed ratio position and, in one aspect thereof, the control mechanism is structured to prevent downshifting directly along a linear path of movement of the shift lever from the one forward drive position to the reverse position.

Furthermore, the mechanism of the invention operates to control shifting in the manner previously described without requiring other concurrent manipulative efforts, such as depression of a button or axial movement of a shift lever.

SUMMARY OF THE INVENTION

Briefly, the present invention may be described as a control mechanism for a manual multiple-forward-speed vehicle transmission having transmission means shiftable between a reverse speed ratio and a plurality of forward speed ratios, a manual shift lever controlling the transmission means by movement thereof through a shift pattern of selection positions which includes a neutral position, said shift lever being connected to shift the transmission means to the reverse speed ratio and to one of the forward speed ratios by movement of the shift lever, respectively, to a pair of selection positions which lie in a substantially linear path extending across the neutral position, and a transmission lever operatively connected between the shift lever and the transmission means to enable shift control by manipulation by the shift lever. More specifically, the control mechanism of the invention is directed to a misshift preventive mechanism for controlling movement of the shift lever along the linear path extending between the selection positions for reverse drive and said one forward drive, said misshift preventive mechanism comprising a first projection extending from said transmission lever and arranged to be moved through a range of motion including a prescribed path corresponding to movement of said shift lever through said linear path, a housing, guide means mounting said housing for rotative movement and for linear movement transversely of said rotative movement, with the range of movement of said housing being defined to include an initial position, a second projection extending from said housing and arranged to be located within said prescribed path of said first projection when said housing is in said initial position, spring means biasing said housing toward said initial position, said first projection being configured to effect initial engagement with said second projection to rotate said housing against the force of said spring means out of said initial position when said shift lever is moved into said linear path through said neutral position, with subsequent disengagement between said first and said second projections by movement of said shift lever within said linear path operating to enable said spring means to return said housing to said initial position to place said second projection within said prescribed path of said first projection to cause said housing to undergo said linear movement as a result of reengagement between said first and said second projections, and stopper means for limiting said linear movement of said housing thereby to prevent misshifting of said transmission which might occur by movement of said shift lever between said selection positions for said one forward speed ratio and said reverse drive directly through said linear path.

The invention involves several specific embodiments which are particularly involved with the structure for mounting the housing and for guiding and limiting the rotational and linear movement thereof. In one aspect of the invention, the movement of the shift lever from the one forward drive position to the reverse drive position directly along the linear path is prevented while movement in the opposite direction, i.e., directly along the linear path from the reverse drive position to the one forward drive position, is not prevented.

In another aspect of the invention, there is prevented direct shifting along the linear path in both directions either from the one forward drive position to the reverse position or from the reverse position to the one forward drive position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the Drawings:

FIG. 1 is a longitudinal sectional view showing a transmission mechanism in which a shift control mechanism according to the present invention is incorporated;

FIG. 2 is a diagrammatic outline depicting the shift pattern through which the shift lever may be moved in a transmission to which the present invention is applied;

FIG. 3 is a sectional view taken along the line III—III of FIG. 1 showing a first embodiment of the present invention;

FIG. 4 is a view in side elevation partially in section looking in the direction of the arrow IV of FIG. 3;

FIG. 5 is a sectional view taken along the line V—V of FIG. 4;

FIG. 6 is a sectional view taken along the line VI—VI of FIG. 1 showing a second embodiment of the present invention;

FIG. 7 is a view in side elevation partially in section looking in the direction of the arrow VII of FIG. 6;

FIG. 8 is a sectional view taken along the line VIII—VIII of FIG. 7;

FIG. 9 is a sectional view taken along the line IX—IX of FIG. 1 showing a third embodiment of the present invention;

FIG. 10 is a view in side elevation looking in the direction of the arrow X of FIG. 9;

FIG. 11 is a sectional view taken along the line XI—XI of FIG. 10;

DETAILED DESCRIPTION OF THE PREFERRED EMBODIMENTS

Figure 12:
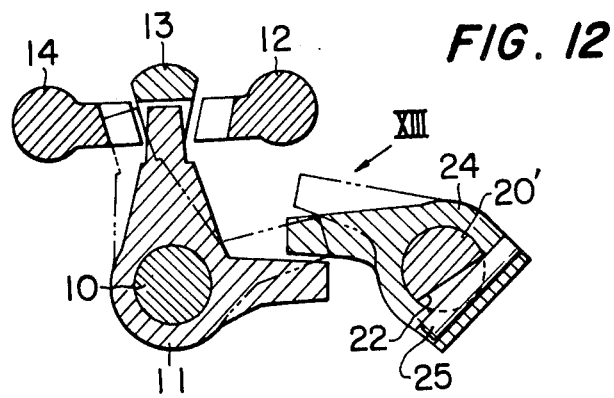
FIG. 12 is a sectional view taken along the line XII—XII of FIG. 1 showing a fourth embodiment of the present invention.

Referring not to the drawings, wherein like reference numerals refer to similar parts throughout the various figures thereof, there is shown in FIG. 1 an example of a manual transmission mechanism involving five forward speed ratios and a reverse drive. A transmission gear mechanism (not shown) is accommodated at the rear of a gear casing 1 having mounted thereon a extension housing 2 through which an output shaft 3 extends. At the upper portion of the housing 2 there is secured, by means of bolts 4, a retainer 5 which supports a shift lever 6. The shift lever 6 includes an upper rounded portion 6a which is urged into contact with a rounded seat portion 5a of the retainer 5 by means of the biasing force of a spring 7. A lower rounded portion 6b of the shift lever 6 is fitted or engaged in a shift lever housing 8 connected to one end of an intermediate rod 10 which is inserted to extend the gear casing 1 through a bore 9 formed in the housing 2.

The shifting and selection operations of the transmission are transmitted from shift lever 6 as axial and revolving motions, respectively, to a transmission lever 11 by way of the intermediate rod 10. The arrangement depicted enables selective shifting operation of the transmission by movement or rocking of the shift lever 6 in longitudinal and transverse directions, respectively. The shift lever 6, when not otherwise urged either by a manipulative effort or by engagement of the transmission gearing, is automatically returned by the action of a selection 18 to a central or neutral position at which its use is most frequently effected. The likelihood of seepage of deleterious material, such as dust, into the retainer 5 may be effectively prevented by a boot 19 which is interposed between the shift lever 6 and the open end of the retainer 5.

As shown in FIG. 3, the lever 11 is formed at its rearwardly extending end with a pawl portion 11a which is adapted to be selectively engageable with engagement grooves 15, 16 and 17 formed on fork shafts 12, 13 and 14, these being shown, by way of example, as comprising three in number. The fork shaft 12–14 are arranged within the gear casing 1 above the transmission gear mechanism in a manner to be moved axially thereof.

Accordingly, by movement of the shift lever 6 to its respective selection positions, the extending portion 11a will be operated to engage one of the grooves 15–17. During the shifting operation, one of the fork shafts 12–14 is moved backwardly and forwardly through engagement between the pawl portion 11a and the corresponding one of the grooves 12–14. Thus, the first and second speed ratios are obtained through the fork shaft 12, and the third and fourth speed ratios are obtained through the fork shaft 13. Moreover, the fifth and reverse speed ratios are obtained through the fork shaft 14. The resultant shift pattern through which the shift lever 16 is moved in its selective operation of the transmission is depicted in FIG. 2.

The present invention is adapted to be incorporated for use within the structural arrangement hereinbefore described to control movement of the shift lever after it has been shifted to the neutral position through a releasing operation involving the highest or fifth speed ratio and the reverse drive position. The shift control mechanism of the invention will be described hereinafter in connection with the five embodiments thereof which are shown in FIGS. 3–12.

Referring now to the first embodiment of the invention which is illustrated in FIGS. 3–5, the transmission lever 11 is formed to include on the right hand side thereof as viewed in FIG. 3, a projection 11b extending integrally from the lever 11.

In the vicinity of the projection 11b there is formed in the gear casing 1 a bore 21 within which a guide shaft 20 is mounted. The shaft 20 is adapted for rotational and axial movement within the bore 21 and at the right end of the shaft 20, as viewed in FIG. 4, there is attached by means of a locking pin 25 a housing 24 which includes a second projection 24a located to be engageable with the first projection 11b of the lever 11. In the arrangement shown, the second projection 24a is engaged by the first projection 11b when the lever 11 is is revolved in a counter clockwise direction, as viewed in FIG. 3.

Between the gear casing 1 and the housing 24 there is interposed a torsion spring 26 which has its intermediate portion wound about the guide shaft 20 with its end portions fitted, respectively, in bores 27 and 28 located in the gear casing 1 and in the housing 24. The torsion spring 26 is maintained under compression and as a result, a biasing force is applied to the housing 24 tending to revolve the housing in a counter clockwise direction, as viewed in FIG. 3, with the second projection 24a being urged toward the first projection 11b. The spring 26 is also adapted to be placed under longitudinal compression by movement of the housing 24 as will be described further hereinafter.

The guide shaft 20 is formed to define a slot 22 within which there is fitted a pin 23 arranged to have its axis extend in a direction perpendicular to the direction of the axis of the bore 21. Accordingly, the slot 22 in cooperation with pin 23 operates to regulate the axial sliding movement and the rotational displacement of the guide shaft 20 relative to the casing 1. Axial displacement of the guide shaft 20 is controlled by abutment of the pin 23 against the ends of the slot 22. As best seen in FIG. 5, in view of the fact that the upper side of the slot 22 includes a surface 22a which may be moved to extend transversely to the direction of the axis of the pin 23, the housing 24 and the shaft 20 may be moved through a limited range of rotational movement relative to the casing 1.

In the construction of the mechanism according to the present invention, certain dimensional relationships are developed between certain parts of the mechanism including the projection 11b of the lever 11, the projection 24a of the housing 24, the slot 22 and the pin 23.

Since a distance $S_D$ between a front end surface 24b of the housing projection 24a and a rear end surface 11d of the lever projection 11b is made larger than the shift stroke which is effected during shifting operation to the reverse drive position of the shift lever 6, the surface 11d will not move leftwardly, as viewed in FIG. 4, beyond the surface 24b when a shifting operation to the reverse drive position is effected. The distance $S_C$ between a front end surface 11c of the projection 11b and a rear end surface 24c of the projection 24a is made slightly smaller than the shift stroke which is effected when there is achieved a shifting operation to the fifth speed ratio, and as a result the surface 11c will move beyond the surface 24c during shifting operation to the fifth speed ratio. The distance $S_C$ is preset to be equal to the distance $S_N$ which extends between the end of the slit 22 and the corresponding side of the pin 23.

The rotational displacement of the housing 24 and of the guide shaft 20 is limited as a result of the configuration of the release surface 22a formed in the slot 22 and by the operational engagement which occurs between the engagement ends 22b and 22c of the surface 22a and the pin 23. The relief surface 22a is arranged to have its engagement point 22b brought into contact with the pin 23 in order to locate the projection 24a slightly apart from the projection 11b. The housing 24 is able to revolve together with the lever 11 when the pin 23 changes its contact point with the slot 22 from the one engagement point 22b to the other engagement point 22c.

In a situation where the transmission lever 11 is located at the position shown in solid line in FIG. 3, with its pawl portion 11a engaging the groove 16 of the fork shaft 13, and where it is turned in the clockwise direction, as shown by the dotted line A of FIG. 3, with its pawl 11a engaging the groove 15 of the fork shaft 12, the projection 11b will be maintained out of engagement with the projection 24a, thus making it possible to obtain the first-through-fourth speed ratios in a manner similar to that which occurs during the operation of conventional transmission mechanisms.

However, in the case where the lever 11 is turned in a counter clockwise direction, as shown by the dotted line B of FIG. 3, with its pawl portion 11a engaging the groove 17 of the fork shaft 14, the projection 11b will be brought into abutment with the projection 24a against the biasing force of the torsion spring 26 so that housing 24 will be turned slightly in the clockwise direction. Accordingly, when it is intended to establish the reverse speed ratio, the lever 11 will be moved leftwardly from the neutral position which is depicted in solid line in FIG. 4, and a shifting operation can be accomplished with the projections 11b and 24a being maintained in engagement by virtue of the fact that the surface 11d will not move beyond the surface 24b.

However, when the lever 11 is moved rightwardly, as indicated by the line C of FIG. 4, so as to obtain the fifth speed ratio, surface 11c will move past surface 24c and the projection 11b will be released from its initial engagement with the projection 24a thereby enabling the housing 24 to revolve and be returned again to its initial position of revolution by the action of the spring 26.

When the transmission is to be shifted out of the fifth speed ratio, the lever 11 will be returned to a position corresponding to the neutral position of the transmission and during this mode of operation, the housing 24 and the shaft 20 will be moved in a direction axially of the shaft 20 by the subsequent engagement which will occur between end surface 11c of the projection 11b and the rear end surface 24c of the projection 24a. Thus, as the projection 24a is moved axially by the projection 11b against the biasing force of the spring 26, the spring 26 will be compressed axially between the casing 1 and the housing 24. When the shift lever 6 reaches the neutral position, the lever 11 will have moved to a position where its further movement will be blocked as a result of the action of the stopper means consisting of the slot 22 and the pin 23. This position of the lever 11 is shown by the dotted line D of FIG. 4. When the housing 24 and the shaft 20 have reached the position where the rightmost side of slot 22 is in engagement with the rightmost side of the pin 23, the shift lever 6 will be in the neutral position and further motion thereof toward the reverse drive position will be blocked. This occurs by virtue of the fact that the lever 11 cannot be moved further toward a shift position representing the reverse drive position of the shift lever 6, and only downshifting of the transmission is possible through clockwise rotation of the lever 11. With such rotation of the lever 11, the end surfaces 11c and 24c will be released from engagement, and the housing 24 will be restored to its initial axial position by operation of the spring 26, thus releasing the misshift preventive action of the mechanism of the present invention thereby allowing the transmission to be subsequently shifted to the reverse speed ratio.

From the foregoing description of the structural configuration of the present invention, it will be seen that during the operation of the transmission, when the shift lever 6 is moved into the linear path which extends between the fifth speed ratio and the reverse drive position, the projection 11b will abut the projection 24a in a side-by-side engagement thereby causing housing 24 to be rotated against the action of the spring 26 out of its initial position. When, by virtue of motion of the shift lever 6 along a linear path between the fifth speed ratio position and the reverse drive position, the projection 11b is moved relative to the projection 24a, the projection 24a will be maintained out of its initial position so long as the configurations of the two projections are such that they are maintained in their initial contacting engagement. However, if the projection 11b slides out of engagement with the projection 24a, the housing 24 will be snapped back to its initial position by operation of the spring 26 thereby bringing the projection 24a into the linear path which is travelled by the projection 11b when the shift lever is moved between the fifth forward drive ratio position and the reverse drive position. In the first embodiment of the present invention described above, this occurs when the shift lever 6 is moved to the fifth speed ratio position and as a result, subsequent motion directly into the reverse drive position is blocked. However, if after being moved to the neutral position, the shift lever is actuated to rotate the projection 11b out of engagement with the projection 24a, the spring 26 will cause axial displacement of the housing 24 back to its initial position and upon subsequent rocking of the shift lever 6, the housing 24 will be rocked to rotate out of its initial position thereby freeing the projection 11b to move along the path corresponding to the path of movement of the shift lever 6 between the fifth drive ratio position in the reverse position.

It will be noted that in the first embodiment hereinbefore described, the housing 24 is fixed relative to the shaft 20 and both these members are arranged to be movable axially and rotatably relative to the casing 1. Furthermore, it will be seen that the stopper means consisting of the slot 22 and the pin 23 are interposed between the shaft 20 and the casing 1 and that these elements operate to control and limit both the rotational movement of the housing 24 and its axial displacement.

A second embodiment of the present invention is shown in FIGS. 6–8 with the basic operation of this second embodiment being essentially similar to that of the first embodiment. In the second embodiment of FIGS. 6–8, the guide shaft 20 is inserted into the bore 21 of the gear casing 1 in a manner similar to that of the first embodiment. However, the slot 22' is formed differently and does not include a relief surface such as the relief surface 22a depicted in FIG. 5. A coil spring 29 is interposed between the gear casing 1 and the housing 24, and the depth of the slot 22' is made to be substantially the same as the height of the exposed portion of the pin 23 so that the guide shaft 20 may be moved axially relative to the casing 1 with a regulated axial stroke. Thus, it will be seen that the guide shaft 20 is arranged to be rotatably fixed relative to the casing 1 while being axially movable relative thereto.

The housing 24, on the other hand, is mounted to be rotatable relative to the shaft 20 and in order to regulate the rotation of the housing 24 the guide shaft 20 is formed on its outer peripheral surface with a cam groove 30 which comprises an L-shaped cross section. A bore 31 is also formed on the outer periphery of the housing 24 at the opposite side of the cam groove 30. Between the cam groove 30 and the bore 31 there is interposed a ball 32 which acts to axially fix the guide shaft 20 and the housing 24 relative to each other. Between the ball 32 and a cotter pin 33 there is interposed a spring 34 which coacts with the ball 32 in order to locate the housing 24 at its initial position with regard to its relative rotational motion with the shaft 20. When the housing 24 is rotated in a clockwise direction, as viewed in FIG. 6, the ball 32 will be pushed outwardly against the action of the spring 34 in order to create a spring biasing force in the counter clockwise direction.

Accordingly, referring to the basic mode of operation of the control mechanism previously described, when the projection 11b engages the projection 24a by movement of the lever 11 to the selecting position corresponding to a position between the fifth speed ratio and the reverse drive position, and when their respective side surfaces go out of engagement by shifting of the lever 11 to the fifth speed ratio position, then the housing 24 will be allowed to rotate in the appropriate directions as heretofore described to control the shifting operations.

Thus, it will be seen that in the second embodiment of the invention depicted in FIGS. 6–8, the shaft 20 is axially movable relative to the casing while the housing 24 is rotatably movable relative to the shaft 20. Again, as in the first embodiment, only direct shifting from the fifth speed ratio position to the reverse drive position is blocked, and the stopper means limiting axial movement of the housing 24 comprise the slot 22' and the pin 3 interposed between the shaft 20 and the casing 1 while the stopper means limiting the rotational movement between the housing 24 and the shaft 20 are interposed therebetween and comprise the groove 30 and the ball 32.

As shown in FIG. 8, rotational movement between the shaft 20 and the casing 1 is prevented by the configuration of the slot 22' with the projections 11b and 24a being brought into and out of engagement by movement of the shift lever 6 in a manner similar to that previously described in connection with the first embodiment.

A third embodiment of the present invention is depicted in FIGS. 9–11. In this embodiment, the guide shaft 20 is again inserted into the bore 21 of the gear casing 1 in a manner similar to that of the previously described embodiments but, contrary to the configuration of the second embodiment, the shaft 20 is prevented from axial movement relative to the casing 1 but is permitted to accomplish relative rotational movement therewith. A bolt 35 is fitted into a slot 22'' with the slot 22'' having a larger depth than the height of the exposed portion of the bolt 35. As a result, and as best seen in FIG. 11, the engagement which occurs between the upper surface of the slot 22'' and the bolt 35 will be such as to enable relative rotation between the shaft 20 and the casing 1 while controlling such relative rotation between prescribed limits.

In order to guide axial movement of the housing 24, the guide shaft 20 is formed with a cut-away surface 36 which contacts a rotation preventive pin 25. The housing 24 is prevented from moving beyond the rightmost end of the shaft 20, as viewed in FIG. 10, by a snap ring 37 and, as a result of the engagement between the surface 36 and the pin 25, the housing 24 is capable of moving axially relative to the shaft 20. A stopper bolt 39 having an adjusting lock nut 38 is mounted upon the gear casing 1 at a position where it will be engaged by the housing 24, with a spacing $S_N$ being provided between the front end surface 24b of the projection 24a and the end of the bolt 39.

Accordingly, when the shift lever 6 is moved in a releasing operation from the fifth speed ratio position, the housing 24 will, by virtue of engagement between the projections 11b and 24a, be moved axially along the guide shaft 20 in a manner to compress the spring 26 until the surface 24b abuts the stopper bolt 39. Such abutment will occur at the neutral position of the shift lever 6 thus preventing overshifting of the transmission to the reverse speed ratio position directly from the fifth speed ratio position through the linear path of the shift lever 6 which is established therebetween. It should be noted that, since the stopper means of this embodiment may be adjusted by operation of the nut 38, the required distance $S_N$ may be readily obtained even with the existence of tolerance errors occurring due to the machining operations in the manufacture of the transmission.

Figure 14:
FIG. 14 is a sectional view taken along the line XIV—XIV of FIG. 13.
Figure 13:
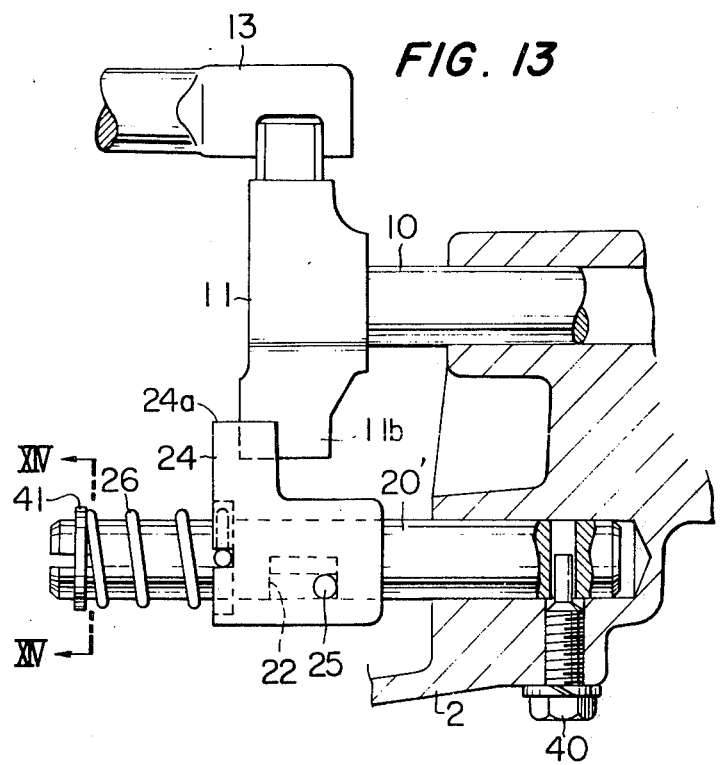
FIG. 13 is a view in side elevation looking in the direction of the arrow XIII of FIG. 12.

In a fourth embodiment of the present invention depicted in FIGS. 12–14, the guide shaft 20' is mounted to be fixed relative to the extension housing 2 by means of a bolt 40. This mode of mounting is different than that of previous embodiments inasmuch as the shaft 20' is fixed both in the axial directions and in the rotational directions relative to the housing 2. The housing 24, however, is mounted to be movable both rotatably and axially relative to the guide shaft 20' by means of the configuration of the slot 22 and its mode of engagement with the pin 25 whose operative cooperation is similar to that of the first embodiment with the exception that these elements are interposed between the housing 24 and the shaft 20' instead of between the shaft 20' and the casing 1. Between the housing 24 and a snap ring 41 secured to the left hand end of the guide shaft 20' as seen in FIG. 13, there is interposed a torsion spring 26 which acts upon the housing 24 upon shifting operations to the fifth speed ratio and the reverse drive position. In the fourth embodiment of FIGS. 12–14, the housing 24 will be moved to rotate by the side-by-side engagement between the projections 11b and 24a and it will be axially movable by engagement between their end surfaces in the manner previously described. The housing 24 will be biased to be returned to its initial position by the spring 26 and the cooperation between the slot 22 and the pin 25 will operate to limit both the rotational and axial movement of the housing 24. Thus, it will be seen that the fourth embodiment of FIGS. 12–14 will operate in essentially the same manner as the first embodiment of FIGS. 3–5 with the exception of the fact that the stop means are interposed between the housing 24 and the shaft 20' instead of between the shaft 20 and the casing 1, as in the first embodiment.

In the four embodiments described thus far, overshifting from the fifth speed ratio to the reverse drive is prevented, as indicated by the arrow $H_R$ shown in FIG. 2. Moreover, shifting operations between the fifth speed ratio and the other forward speed ratios, and between the reverse speed ratio and the forward speed ratios including the fifth speed ratio, as shown by the arrows F, G and $H_5$ respectively, may be accomplished in the four embodiments described above.

However, in a fifth embodiment of the present invention, the overshifting operation depicted by the arrow $H_5$ is additionally prevented in order to enhance operation of the transmission from the standpoint of safety.

Figure 15:
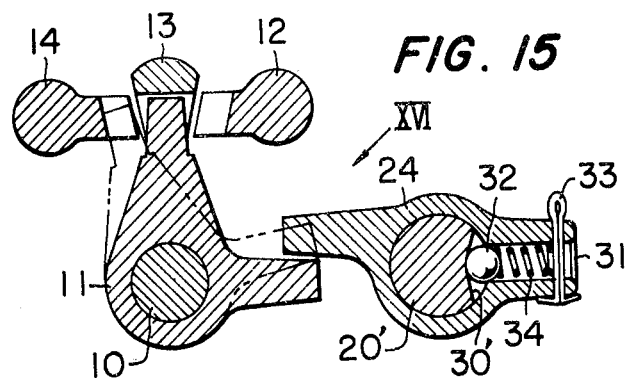
FIG. 15 is a sectional view taken along the line XV—XV of FIG. 1 showing a fifth embodiment of the present invention.
Figure 16:
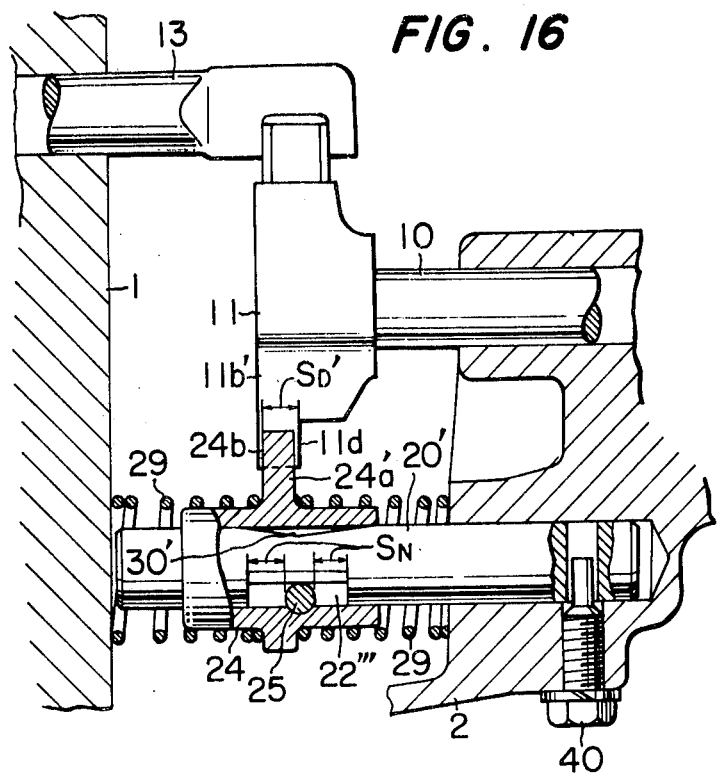
FIG. 16 is a view in side elevation looking in the direction of the arrow XVI of FIG. 15.

In the fifth embodiment of the present invention depicted in FIGS. 15 and 16, the housing 24 is mounted on the guide shaft 20' in a manner similar to that of the fourth embodiment. The guide shaft 20' is attached to the extension housing 2 by a bolt 40 and the housing 24 is arranged to be rotatably and axially movable relative to the shaft 20' by the interfitting engagement between the pin 25 and a slot 22''', with two identical spacings $S_N$ being provided on both sides of the pin 25 between the pin and the ends of the slot 22''' so that movement of housing 24 during shifting operations between the fifth speed ratio and the reverse drive position may be controlled.

A distance $S_D$ between the rear end surface 11d of the projection 11b' and the front end surface 24b of the projection 24a' is made slightly smaller than the shift stroke for the shifting operation to the reverse speed ratio, so that the engagement therebetween may be released during the particular shifting operation. Although the ball 32 is interposed between the guide shaft 20' and the housing 24 in a manner similar to that of the second embodiment, the cam groove 30', which is formed in the guide shaft 20', is shaped to have a conical surface in order to permit axial movement of the housing 24. Between the housing 24 and the gear casing 1, and between the housing 24 and the extension housing 2, there are interposed two coil springs 29 each of which has the same spring force. Accordingly, even upon shifting to the reverse speed ratio, engagement between the projections 11b' and 24a' will be released in order to bring the rear end surface 11d into contact with the front end surface 24b. As a result, the housing 24 will be moved to prevent overshifting operation to the fifth speed ratio by operation of the stopper action of the slot 22''' and the pin 25.

As has been described above, in accordance with the present invention, since the transmission lever 11 is blocked after it has been shifted to the neutral position from the fifth speed ratio, possible erroneous shifting operation from the fifth speed ratio to reverse drive, which is located at the opposite shifting position on the line shared with the fifth speed ratio, can be completely prevented. This misshift preventive action is automatically released upon downshifting operation from the fifth speed ratio. Moreover, since the shifting operation to the reverse speed ratio can be accomplished without requiring additional operations such as pulling of the shift lever 6, the operations involved can be simplified and the feeling imparted to the driver during shifting is accordingly improved. In the case where the torsion spring 26 is employed in the five embodiments previously disclosed, the structure of the present shift control mechanism may be simplified with a reduction in the number of parts because of the compressive and torsional action of the spring 26. Furthermore, it should be appreciated that in the case where the guide shaft 20' is attached to the extension housing 2, the assembly may be advantageously simplified. Furthermore, it will be seen that in the fifth embodiment improved safety features are provided by virtue of the fact that direct shifting along the straight line path of the shift lever 6 is prevented both from the fifth speed ratio position to the reverse drive position and vice versa, from the reverse drive position to the fifth speed ratio position.

In the foregoing description of the present invention there has been provided a disclosure involved solely with a five forward speed manual transmission having its reverse drive shift lever position and its fifth speed ratio position located at opposite ends of an identical line of shift pattern. However, it should be noted that the present invention could also be applied with similar advantage to the case where the reverse speed ratio is located at the opposite end of a shift line having another of the forward speed ratios located thereupon. Moreover, the shift control mechanism accordingly may be attached directly to the shift lever if desired.

While specific embodiments of the invention have been shown and described in detail to illustrate the application of the inventive principles, it will be understood that the invention may be embodied otherwise without departing from such principles.

What is claimed is:

1. In a manual multiple-forward-speed vehicle transmission having transmission means shiftable between a reverse drive and a plurality of forward speed ratios, a manual shift lever controlling said transmission means by movement through a shift pattern of selection positions including a neutral position, said shift lever being connected to shift said transmission means to said reverse drive and to one forward speed ratio by movement thereof, respectively, to a pair of selection positions lying at the ends of a substantially linear path extending across said neutral position, and a transmission lever movable with said shift lever and operatively interconnected between said shift lever and said transmission means; a misshift preventive mechanism for controlling movement of said shift lever along said linear path between said selection positions for said reverse drive and said one forward speed ratio, said misshift preventive mechanism comprising a first projection extending from said transmission lever and arranged to be moved through a range of motion including a prescribed path corresponding to the movement of said shift lever through said linear path, a housing, guide means mounting said housing for rotative movement and for linear movement transversely of said rotative movement, with the range of movement of said housing being defined to include an initial position, a second projection extending from said housing and arranged to be located within said prescribed path of said first projection when said housing is in said initial position, spring means biasing said housing to said initial position, said first projection being configured to effect initial engagement with said second projection to rotate said housing against the force of said spring means out of said initial position when said shift lever is moved into said linear path through said neutral position, with subsequent disengagement between said first and said second projection by movement of said shift lever within said linear path operating to enable said spring means to return said housing to said initial position to place said second projection within said prescribed path of said first projection to cause said housing to undergo said linear movement as a result of reengagement between said first and second projections, and stopper means for limiting said linear movement of said housing thereby to prevent misshifting of said transmission which might occur by movement of said shift lever between said selection positions for said one forward speed ratio and said reverse speed ratio directly through said linear path.

2. A mechanism according to claim 1 wherein said guide means include a guide shaft having said housing mounted thereon.

3. A mechanism according to claim 2 wherein said transmission means includes a casing and wherein said guide shaft is mounted for axial and rotative movement relative to said casing with said housing being fixedly mounted upon said guide shaft.

4. A mechanism according to claim 3 wherein said spring means is interposed between said housing and said casing and is configured to apply both a torsional spring force rotatively biasing said housing and said guide shaft relative to said casing and a compressive force axially biasing said guide shaft relative to said casing.

5. A mechanism according to claim 4 wherein said stopper means is operatively interposed between said casing and said guide shaft and operates to limit in both directions axial movement of said guide shaft and rotative movement of said guide shaft relative to said casing.

6. A mechanism according to claim 5 wherein said stopper means comprise a slot formed in said guide shaft and a pin operatively interposed in cooperative relationship with said slot.

7. A mechanism according to claim 6 wherein said pin is mounted in a fixed position relative to said casing and extends generally perpendicularly to the axis of said guide shaft and wherein said slot comprises an enlarged configuration permitting movement thereof relative to said pin and a relief surface permitting said guide shaft to rotate within fixed limits relative to said pin.

8. A mechanism according to claim 2 wherein said transmission includes a casing and wherein said guide shaft is mounted for axial movement relative to said casing with said housing being mounted for rotative movement relative to said guide shaft but being fixed axially thereof, said spring means being interposed between said housing and said casing.

9. A mechanism according to claim 8 wherein said stopper means comprises axial limit means interposed between said guide shaft and said casing for limiting axial displacement therebetween and rotational limit means interposed between said housing and said guide shaft to restrict within fixed limits rotative movement therebetween.

10. A mechanism according to claim 9 wherein said axial limit means comprise a slot formed in said guide shaft and a pin fitted for engagement within said slot and extending generally perpendicularly to the axis of said guide shaft.

11. A mechanism according to claim 9 wherein said rotational limit means comprise a cam groove formed in said guide shaft and a ball mounted for engagement within said cam groove, with a limit spring extending between said housing and said ball to bias said ball into engagement within said cam groove.

12. A mechanism according to claim 2 wherein said transmission includes a casing and wherein said guide shaft is mounted for rotative movement relative to said casing but is axially fixed thereupon, with said housing being arranged to be rotatably fixed relative to said guide shaft but axially movable therealong, said spring means being interposed between said casing and said housing.

13. A mechanism according to claim 12 wherein said stopper means include rotational limit means interposed between said casing and said guide shaft to permit relative rotational motion therebetween within fixed limits, and axial limit means interposed between said housing and said guide shaft to enable axial movement of said housing along said guide shaft within fixed limits.

14. A mechanism according to claim 13 wherein said rotational limit means comprise a slot formed in said guide shaft and a bolt fixed relative to said casing and extending to within said slot, said slot being dimensioned to engage said bolt to enable limited rotational movement between said guide shaft and said casing but to prevent relative axial movement therebetween.

15. A mechanism according to claim 2 wherein said transmission includes a casing and wherein said guide shaft is fixed relative to said casing with said housing being mounted for relative axial and rotational movement relative to said guide shaft, said spring means being interposed between said housing and said guide shaft.

16. A mechanism according to claim 15 wherein said stopper means are interposed between said housing and said guide shaft.

17. A mechanism according to claim 1 wherein said first projection is configured to become disengaged from said second projection when said shift lever is moved to a selection position corresponding to said one forward drive position after said initial engagement, thereby to enable said spring means to place said second projection to within said prescribed path of said first projection, said stopper means being arranged to permit said shift lever to be moved along said linear path from said one forward drive position to said neutral position but to prevent further movement of said shaft lever directly along said linear path towards said reverse position.

18. A mechanism according to claim 17 wherein said first projection is configured to maintain said initial engagement when said shift lever is moved, subsequent to said initial engagement, from said neutral position to said reverse position thereby maintaining said second projection out of said prescribed path of said first projection.

19. A mechanism according to claim 1 wherein said first projection is configured to become disengaged from said second projection when said shift lever is moved in either direction from said neutral position towards one forward drive position or towards said reverse position after said initial engagement thereby to enable said spring means to place said second projection to within said prescribed path of said first project, said stopper means being arranged to permit said shift lever to be moved along said linear path towards said neutral position from both said one forward drive position and said reverse position but to prevent further movement therealong said neutral position directly along said linear path.

20. A mechanism according to claim 5 wherein said transmission includes a casing and wherein said guide shaft is fixed relative to said casing with said housing being mounted for axial and rotatable displacement relative to said guide shaft, said spring means being arranged on opposite sides of said housing to return said housing to said initial position when displaced therefrom in either direction axially of said guide shaft, said stopper means being interposed between said housing and said guide shaft with said first projection being dimensioned to become disengaged from said second projection after said initial engagement therebetween whenever said shift lever is moved either from said neutral position towards said one forward drive position or from said neutral position towards said reverse position.

* * * * *